United States Patent [19]
Nixon

[11] Patent Number: 5,293,437
[45] Date of Patent: Mar. 8, 1994

[54] FIBER OPTIC DISPLAY WITH DIRECT DRIVEN OPTICAL FIBERS

[75] Inventor: Michael A. Nixon, Fuquay-Varina, N.C.

[73] Assignee: Visual Optics, Inc., Frisco, Tex.

[21] Appl. No.: 893,222

[22] Filed: Jun. 3, 1992

[51] Int. Cl.⁵ ............................................. G02B 6/04
[52] U.S. Cl. ................... 385/115; 385/116; 385/121; 362/32
[58] Field of Search ............. 40/546, 547; 362/32; 385/115, 120, 121, 114, 116

[56] References Cited

U.S. PATENT DOCUMENTS

| | | | |
|---|---|---|---|
| 4,090,104 | 5/1978 | Vann et al. | 358/901 |
| 4,650,280 | 3/1987 | Sedlmayr | 385/120 |
| 4,695,129 | 9/1987 | Faessen et al. | 358/901 |
| 4,702,552 | 10/1987 | Margolin | 385/121 |
| 4,773,730 | 9/1988 | Sedlmayr | 385/137 |
| 4,786,139 | 11/1988 | Sedlmayr | 385/120 |
| 4,867,530 | 9/1989 | Sedlmayr | 385/116 |
| 4,950,357 | 8/1990 | Sedlmayr | 385/114 |
| 4,975,729 | 12/1990 | Gordon | 385/116 |
| 5,033,814 | 7/1991 | Brown et al. | 385/119 |
| 5,053,765 | 10/1991 | Sonehara et al. | 358/901 |

Primary Examiner—Frank Gonzalez
Attorney, Agent, or Firm—Ross, Howison, Clapp & Korn

[57] ABSTRACT

An image transfer system includes a display (10), which has associated therewith a plurality of pixels formed by optical fiber ends (12) which provide the terminating end of a plurality of optical fibers disposed in a fiber optic bundle (14). The opposite end of the optical fibers in the fiber optic bundle (14) are disposed on a display module (16), which is operable to generate a transferred image through the fiber optic bundle (14). Each of the optical fibers associated with the display module (16) have associated therewith a light emitting diode (LED) (20). Each of the LEDs (20) are operable to directly drive each of the associated optical fibers. The LEDs (20) are arranged in a display array (30) and are controlled to generate information associated with a given pixel. The optical fiber ends (12) are fabricated with a tapered configuration such that the end of each of the associated optical fibers tapers from a narrow dimension to a wider diameter, this being a linear taper on the end thereof. This provides an expansion of the optical fiber along its length.

16 Claims, 5 Drawing Sheets

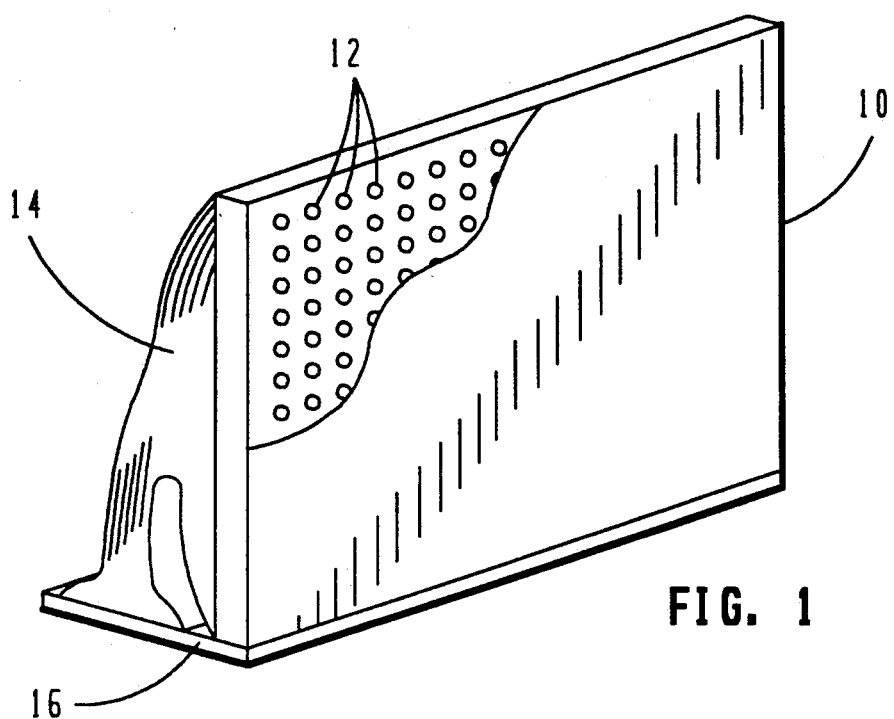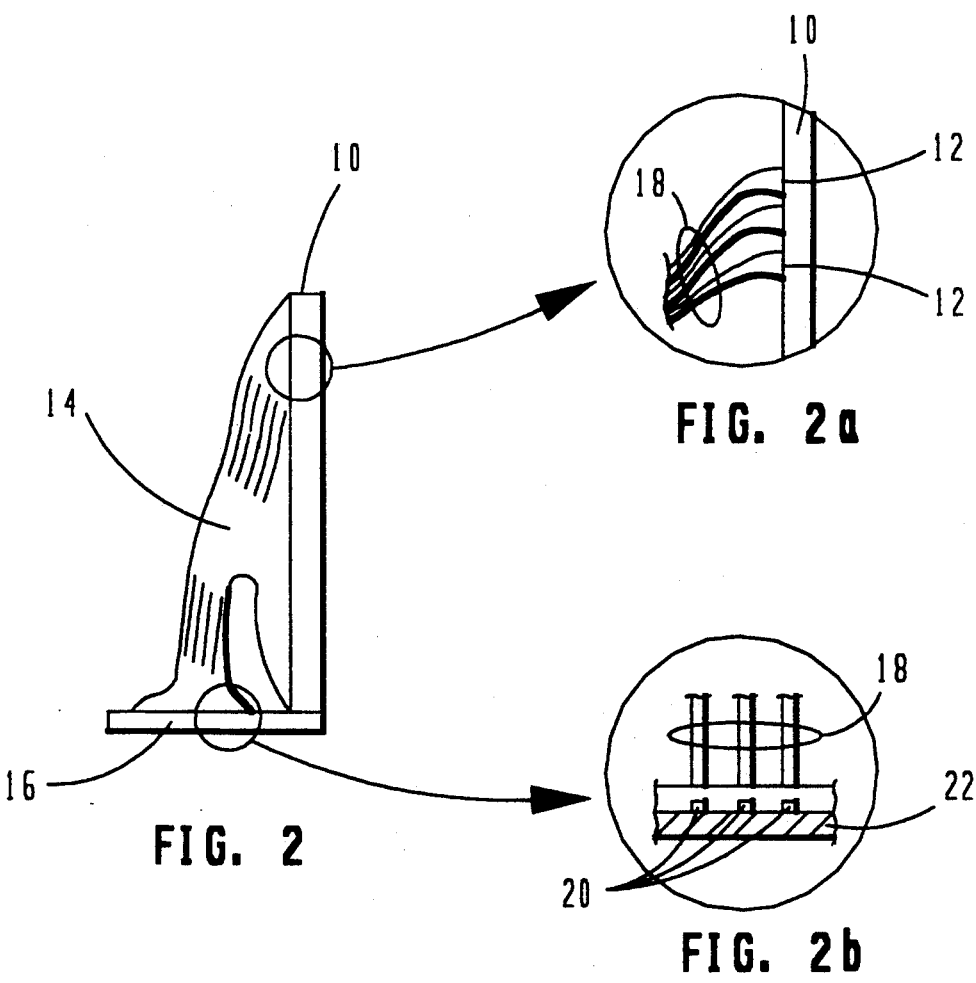

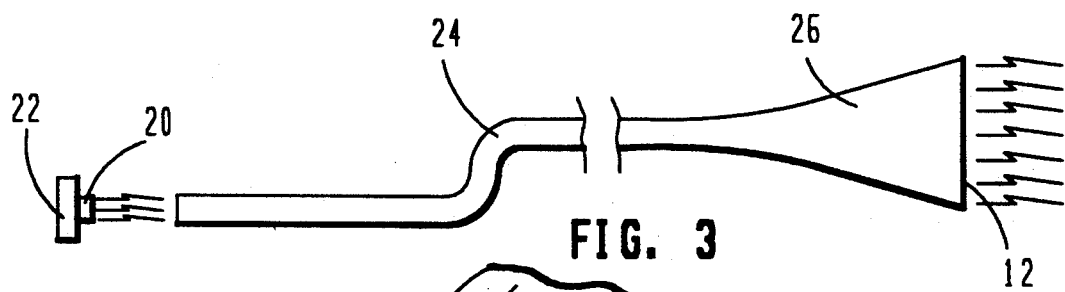
FIG. 3
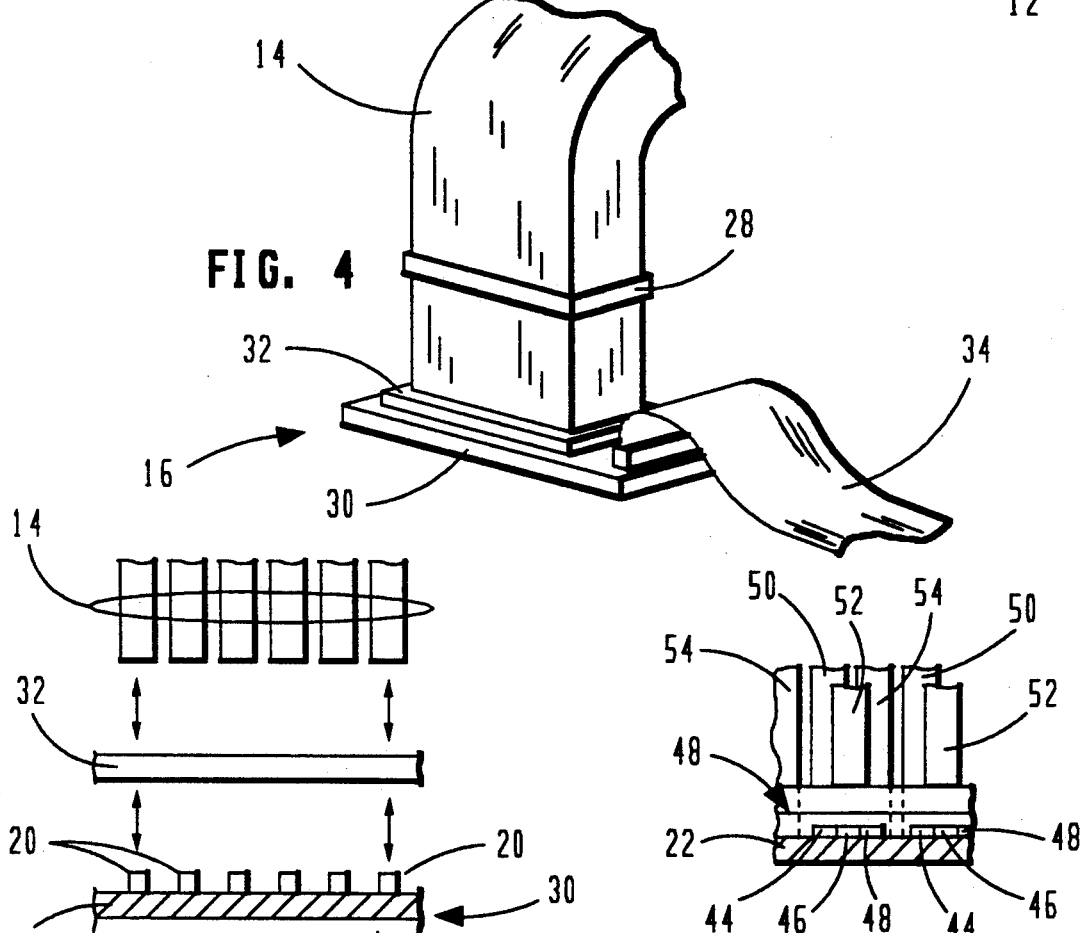
FIG. 4
FIG. 5
FIG. 6
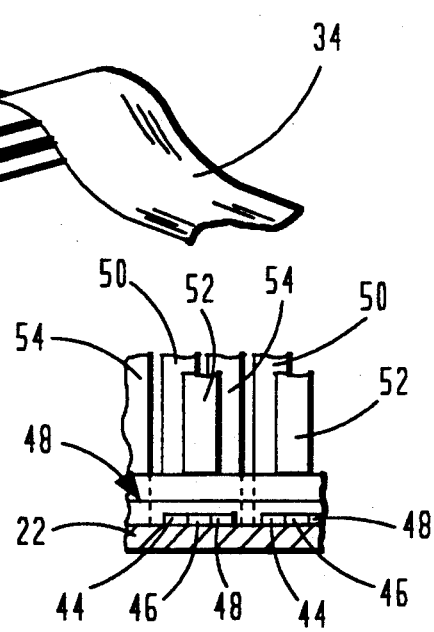
FIG. 7
FIG. 7a

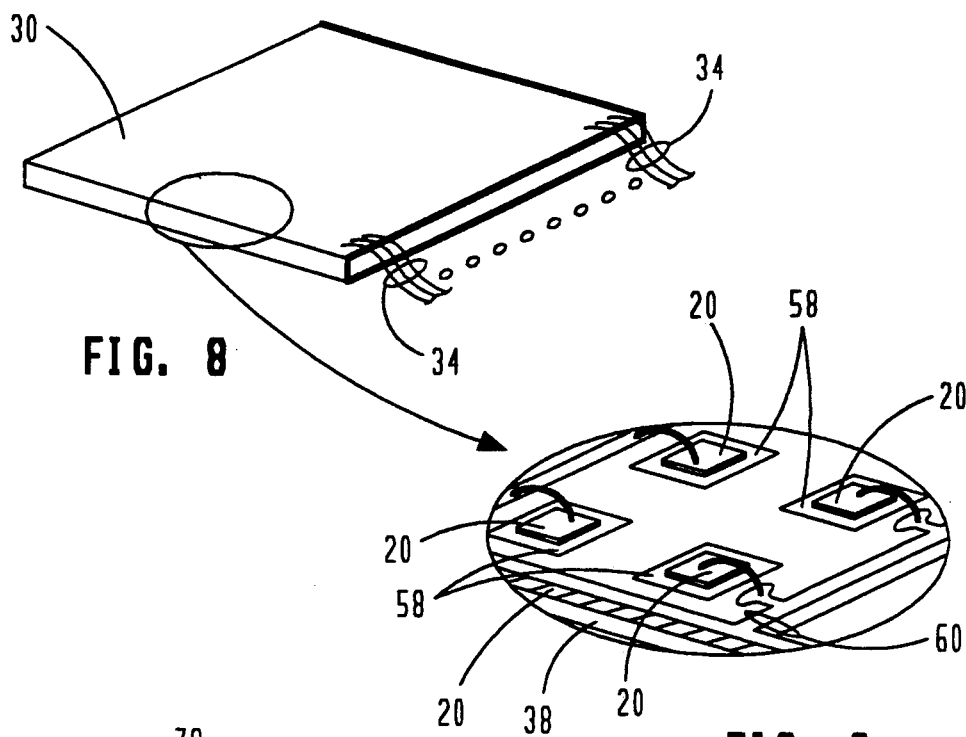
FIG. 8
FIG. 8a
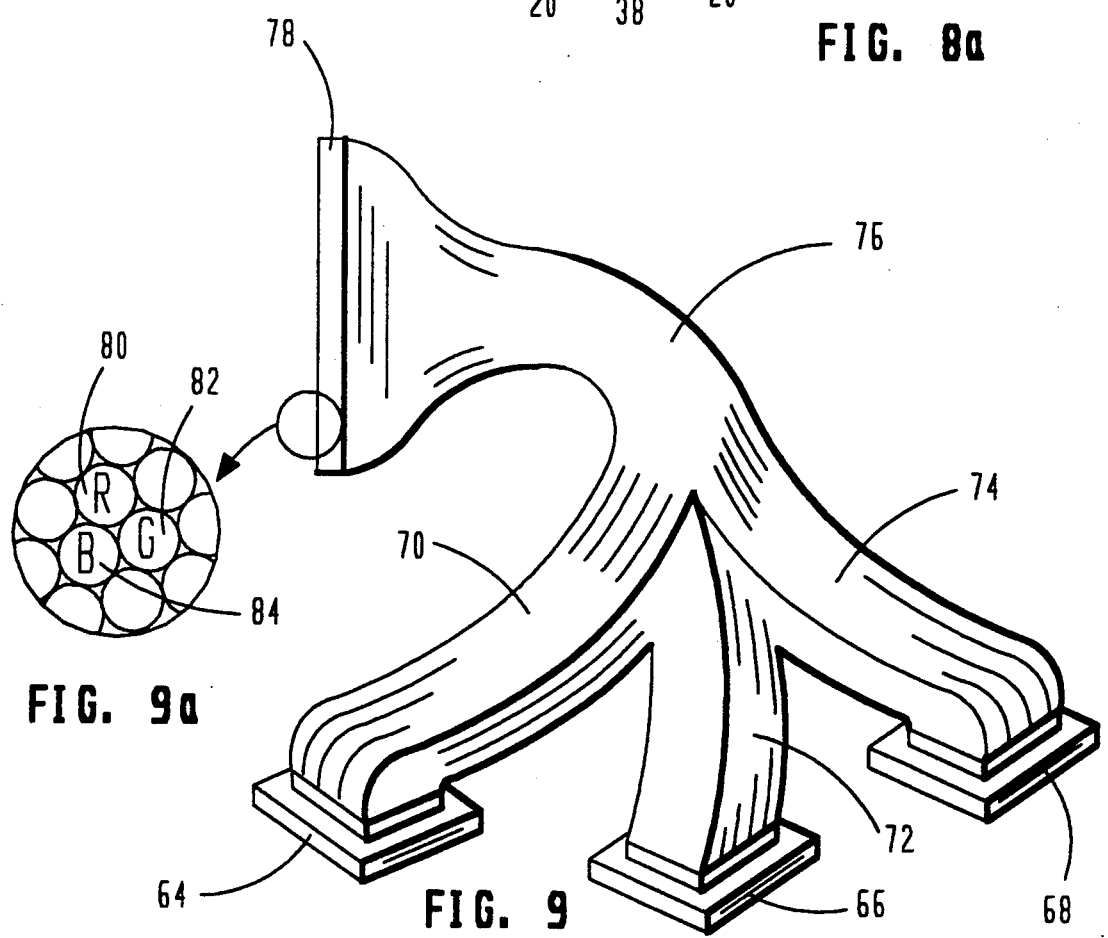
FIG. 9a
FIG. 9

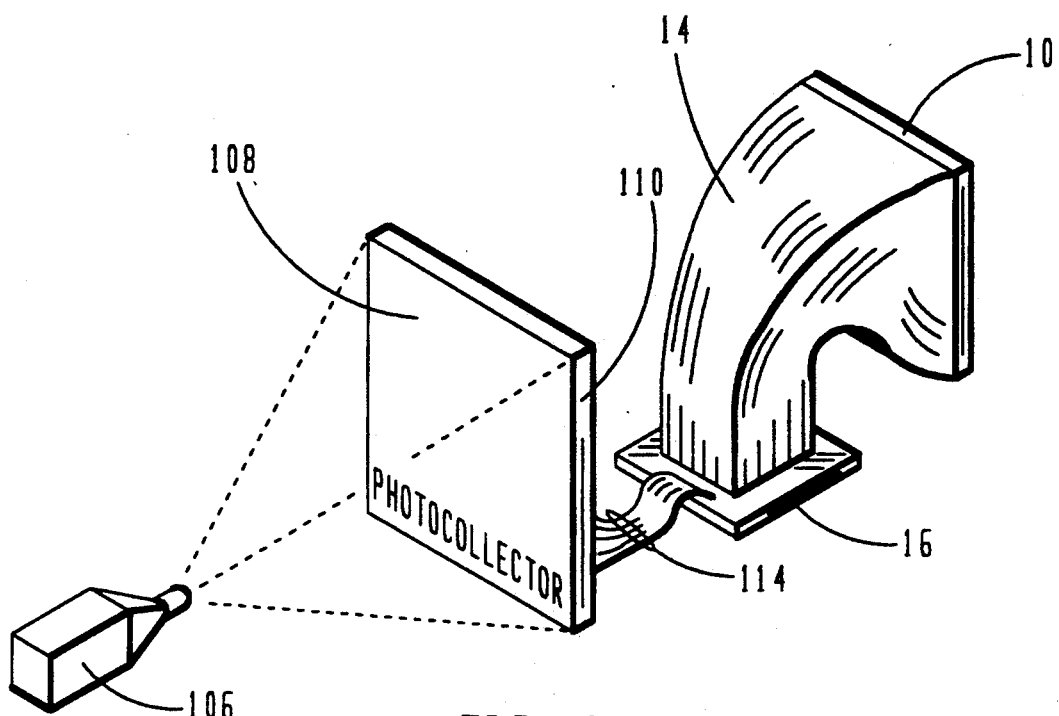
FIG. 12
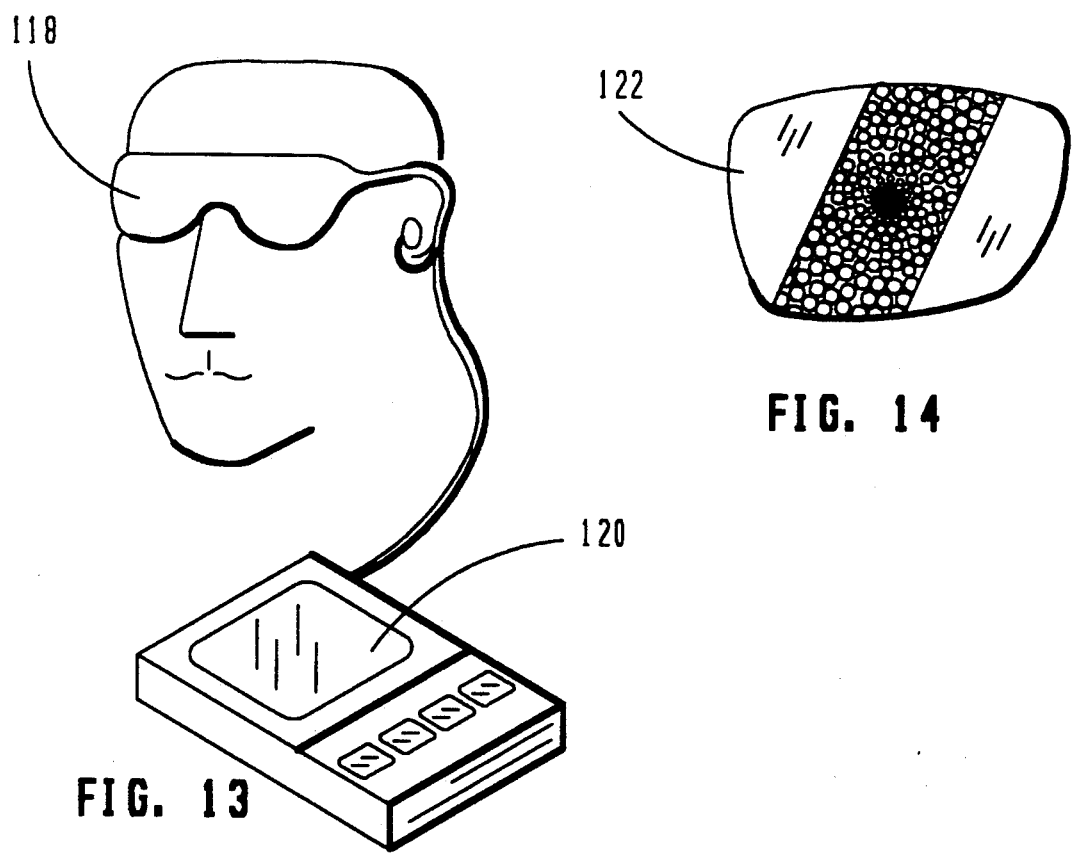
FIG. 13
FIG. 14

FIBER OPTIC DISPLAY WITH DIRECT DRIVEN OPTICAL FIBERS

TECHNICAL FIELD OF THE INVENTION

The present invention pertains in general to displays, and more particularly, to a multi-pixel display having the pixels thereof provided by fiber optics.

BACKGROUND OF THE INVENTION

Display technology has evolved from the original TV cathode ray tube, which utilizes a phosphorescent screen over which a stream of electrons is directed to cause changes in the optical properties thereof, to liquid crystal (LCD) displays which allow the implementation of flat screen displays. Another kind of display, image transfer display, has been utilized to realize large format displays, such as billboards and the such. One common aspect of the latest technology is the conversion of the image to individual picture elements (pixel) and the mapping of these pixels onto a display surface.

The image transfer displays have generally utilized fiber optic bundles to pick up an image in one plane and transfer that image to another plane. However, one disadvantage to this type of display is that it is merely an image transfer display and requires the image to be projected onto the first plane with sufficient intensity to propagate through the fibers and onto a larger display. The larger display achieves its size increase through a number of different techniques. One is the use of a lens at the exit end of the fiber optic cable and another utilizes a slanted fiber optic cable. This slanted fiber optic cable increases the overall surface area as compared to the input of the cable. This type of system is disclosed in U.S. Pat. No. 4,773,730, issued Sep. 27, 1988, U.S. Pat. No. 4,650,280, issued Mar. 17, 1987 and U.S. Pat. No. 4,867,530, issued Sep. 19, 1989, all of which are incorporated herein by reference.

SUMMARY OF THE INVENTION

The present invention, disclosed and claimed herein comprises an image transfer device. The image transfer device includes a display surface and a plurality of optical fibers having first and second ends. The optical fibers are arranged in a bundle, with the second end of the optical fibers abutted against the display surface in a predetermined pattern. The first end of each of the optical fibers is associated with a dedicated light emitter. Each of the light emitters is operable to emit light at a predetermined wavelength and intensity into the first end of the associated optical fiber. A pattern generator is provided to control each of the light emitters to determine the intensity of the emitted light therefrom in accordance with a predetermined pattern.

In another aspect of the present invention, the light emitters are arranged in an array of light emitters, the light emitters comprising LEDs. The array of light emitters is bit-mapped to the predetermined pattern with the optical fibers in the bundle operable to map the array of light emitters onto the display.

In a further aspect of the present invention, the light emitters are arranged in red-green-blue triplets, such that the fibers associated with each of the light emitters in the red-green-blue triplets is mapped onto the display surface in an adjacent relationship to provide a red-green-blue pixel. In one embodiment, the light emitters associated with each of the red-green-blue triplets are disposed in the array in an adjacent relationship.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a perspective view of the display of the present invention;

FIG. 2 illustrates a side view of the display of FIG. 1;

FIGS. 2a and 2b illustrate details of FIG. 2;

FIG. 3 illustrates a detail of the tapered fiber utilized in the present invention;

FIG. 4 illustrates a detail of the interconnection of the fiber bundle and the display module;

FIG. 5 illustrates a detail of the display module and the interface thereof with the fiber bundle;

FIG. 6 illustrates a detail of a single LED and its relationship to an associated fiber in the fiber bundle;

FIG. 7 illustrates an alternate embodiment utilizing three separate color LEDs to provide a color triplet;

FIG. 7a illustrates a top view of the color triplet of LEDs;

FIG. 8 and FIG. 8a illustrate a detail of the LED array;

FIG. 9 and FIG. 9a illustrates an alternate embodiment utilizing three separate arrays for each of the three colors;

FIG. 12 illustrates an embodiment wherein a optocollector is utilized to receive an image and transfer it through electrical signals for driving the LEDs;

FIG. 13 illustrates an application of the display module to goggles; and

FIG. 14 illustrates a detail of the fiber layout for the display in the system of FIG. 13.

DETAILED DESCRIPTION OF THE INVENTION

Figure 10:
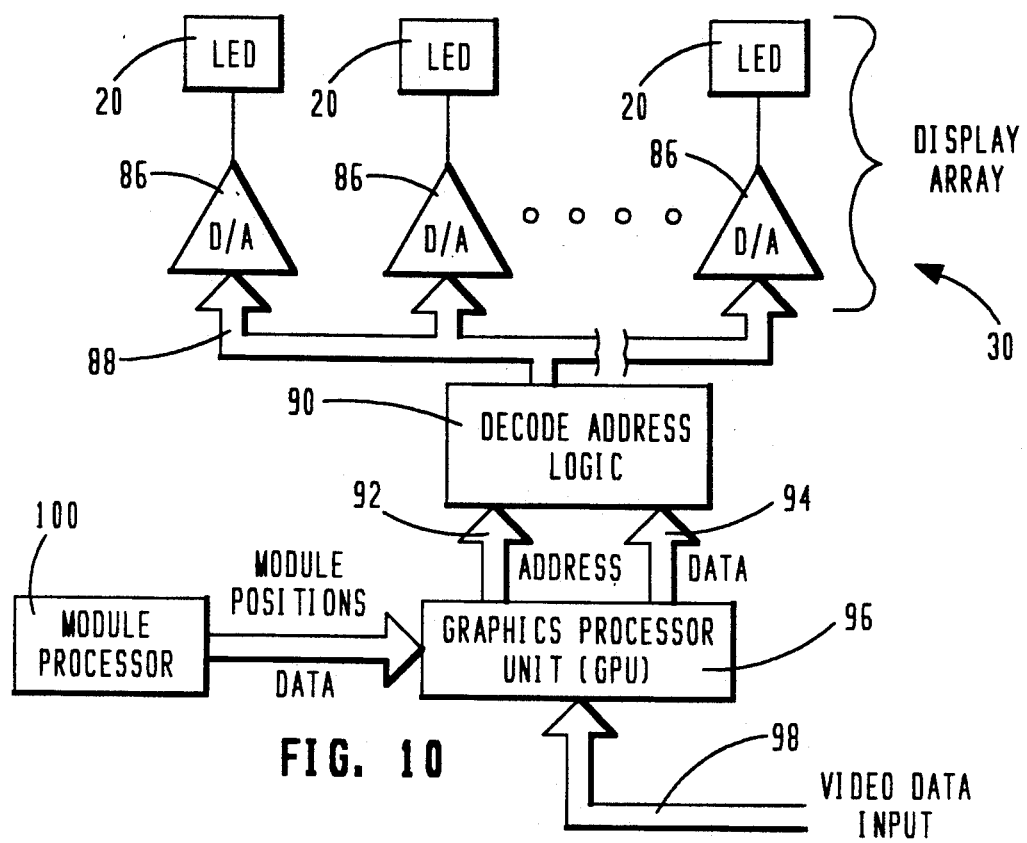
FIG. 10 illustrates a block diagram of the module.

Referring now to FIG. 1, there is illustrated a perspective view of a display 10 utilizing the image transfer system of the present invention. The display 10 is comprised of a plurality of pixels, each formed at the end 12 of an optical fiber, illustrated in a corner detail. The optical fiber ends 12 are part of a fiber optic bundle 14 that is connected on one side to the display 10 at the ends 12, and on the other end to a direct-driven display module 16. As will be described in more detail hereinbelow, the display module 16 is operable to selectively drive each of the optical fibers in the fiber optic cable bundle 14 to provide the correct image information at the optical fiber ends 12.

Referring now to FIG. 2, there is illustrated a side view of the display 10 and fiber optic bundle 14 of FIG. 1. A detail of the connections of the optical fiber ends 12 to the display 10 is illustrated in FIG. 2a. It can be seen in FIG. 2a that at the optical fiber end 12, the diameter of the optical fiber is larger than at the originating end. These are referred to as "tapered fibers", which are utilized in the present invention to expand the viewing area. FIG. 2b illustrates a detail of the opposite end of the optical fibers in the fiber bundle 14, illustrating the driving mechanism therefore. A plurality of Light Emitting Diodes (LEDs) 20 are provided in an array that is disposed on a substrate 22. Each of the LEDs 20 is disposed beneath the surface of one of the optical fibers 18 on the end opposite to the optical fiber end 12 such that they directly drive each of the optical fibers 18. Therefore, the system of the present invention provides a direct driven optical fiber with each optical fiber comprising a pixel. The detail illustrated in FIG. 2b illustrates one diode per optical fiber, with each diode comprising a pixel. However, as will be described hereinbelow, a color triplet, comprising a red, green and blue LED, can be provided with three separate optical fibers utilized for this triplet.

Referring now to FIG. 3, there is illustrated a detailed diagram of a single optical fiber. The optical fiber is manufactured utilizing conventional plastic and glass materials from which optical fibers are generally fabricated. As is well known in the art, the optical fibers are utilized to transmit light through internal reflections. Therefore, the outer surface of the fiber must have adequate optical properties and the interior of the fiber must have high light transmissivity properties. The optical fiber of the present invention is comprised of a base portion 24, which for the large portion thereof has a diameter of approximately 250 micrometers ($\mu$m), with the display side of the optical fiber at optical fiber end 12 having a diameter of approximately 750 $\mu$m to provide a 3:1 expansion ratio. The taper is provided along a portion 26, with the taper having a length of approximately 0.75 inch. At the junction of the portion 26 and the portion 24, a gradual radius of curvature is provided with the remaining portion of the portion 26 having a linear taper up to the optical fiber end 12. The tapered fiber therefore provides an expansion of the cross-sectional at the input end of the portion 24 such that the overall display area is increased. Of course, the intensity input to the originating end of portion 24 will be attenuated by the internal attenuation of the fiber 24 and what remains after attenuation will be spread out over the surface area of the optical fiber end 12. The advantage is that the light will be emitted with relatively little distortion and at a precise point on the output display. The LED 20 can have the current therethrough adjusted to determine the actual intensity that is input to the portion 24, such that adjacent optical fibers can provide varying levels of intensity.

Referring now to FIG. 4, there is illustrated a detail of the fiber optic bundle 14. The fiber optic bundle 14 is comprised of a plurality of layers of adjacently disposed optical fibers. In accordance with conventional manufacturing procedures, the optical fibers are manufactured as flat cables with a plurality of adjacently disposed ends. The flat cables are then bundled into the bundle 14 and either glued or secured with a strap 28. The ends of the optical fibers in the bundle 14 are arranged such that they are in a flat plane. These are disposed adjacent a display array 30 on the display module 16 with a quartz window 32 disposed between the display array and the fiber optic bundle 14. The display array 30 is driven by a plurality of signal lines through a cable 34, the cable 34 providing a plurality of individual signals that drive each of the LEDs 20. Typically, video information is latched into some type of register as an analog value, this analog value then being maintained on some type of sample and hold circuit. As long as the value in the sample and hold circuit remains the same, the optical output of the LED associated with each fiber will remain at a given intensity.

Referring now to FIG. 5, there is illustrated a detail of the interface between the input end of the fiber optic bundle 14 and the display array 30. The display array 30 is fabricated from a plurality of the diodes 20 disposed on the substrate 22 in a predetermined array configuration. The substrate 22 is mounted on a circuit board or similar structural member and then the associated fibers in the fiber optic bundle 14 disposed therebeneath. Typically, the ends of the fiber optic bundle 14 on the input side thereof are disposed in a common plane. They are adhered to a quartz window 32 to allow for a planar alignment thereof. The quartz window 32 is then disposed over the upper surface of the LEDs 20 with a conventional bonding material that exhibits excellent light transmissivity. During bonding of the quartz window 32 to the fiber optic bundle 14 and also to the surface of the LEDs 20, the fiber optic bundle 14 can be manipulated such that maximum intensity is achieved from the array. Typically, this is achieved by inputting a predetermined pattern to the LED array and then viewing this pattern at the output side of the fiber optic bundle 14 on the fiber optic ends 12. By adjusting the fiber optic bundle 14 relative to the quartz window 32 and the LEDs 20, the display can be maximized for both the intensity and position.

Referring now to FIG. 6, there is illustrated a single optical fiber 40 in the fiber optic bundle 14 that is adhered on the end thereof to the quartz window 32. The dimension of the diameter of the optical fiber 40 is approximately three times the width of the LED 20. Therefore, a significant amount of tolerance is provided by the end of the optical fiber 40 such that it can be moved with respect to the surface of the LED 20. Of course, maximum intensity will occur when the LED is substantially disposed within the center of the optical fiber 40. However, a number of manufacturing tolerances must be accommodated, such as the center-to-center alignment of optical fibers, the center-to-center alignment of the LEDs in the array on the substrate 22, etc.

Referring now to FIG. 7, there is illustrated an alternate embodiment of the LED array 30, utilized to provide a three-color system. The three-color system is achieved by utilizing a triplet of LED diodes comprised of a red LED 44, a green LED 46 and a blue LED 48, all disposed in a single area, the alignment thereof illustrated in a top view in FIG. 7a. These diodes are disposed in a triangular configuration. Each triplet has associated therewith three optical fibers 50, 52 and 54, associated with the LEDs 44, 46 and 48, respectively.

Referring now to FIG. 8, there is illustrated a detail of the display array 30. Display array 30 is comprised of a plurality of light emitters, in the preferred embodiment LEDs, disposed on a rectangular array. A detail of a portion of the array is illustrated in FIG. 8a. Each of the LEDs 20 is disposed on a bond pad 58, the LEDs 20 are each comprised of separate LED chips. During fabrication, the LEDs are formed on a semiconductor wafer which is comprised of an array of LEDs with no interconnection pattern disposed thereon. These devices are then tested on the wafer to determine which ones are good, and the bad ones marked. The wafer is then diced, and the individual chips selected to select only the ones that pass the initial test. These are then bonded to the bond pads 20 with conventional techniques.

An array of LED driving lines 60 are provided on the surface of the substrate 20, these lines 60 individually bonded to one side of the LED 20, the other side of the LED 20 electrically connected to the bonding pad 58.

The bonding pads 58 are all disposed at a common potential, with the only requirement to excite the LEDs 20 being to provide a current path through one of the lines in the line array 60. The bonding is typically provided by "wire bonding" to provide the interconnection with the other side of the LED. Again, these are conventional techniques. The array of wires 60 is routed to the edge of the display array 30 for interconnection with the wire cable 34.

The substrate 20 is generally fabricated from a ceramic substrate that is fabricated of aluminum oxide with a gold or aluminum pattern deposited on the upper surface thereof. This again is conventional technology. Additionally, to minimize the number of wires in the cable 34, the cable could be fabricated from a data bus with decoding circuitry disposed on the substrate 20 at select locations therein to decode the input signal and route this to a digital-to-analog converter (DAC) that had a sample hold circuit on the output thereof. It would only be necessary to address each of the DACs to generate an analog signal on the output thereof. As such, a data bus would be required on the input to the substrate.

Referring now to FIG. 9, there is illustrated an alternate embodiment for providing the color triplet. In the alternate embodiment of FIG. 9, three display modules, a red display module 64, a green display module 66 and a blue display module 68 are provided, each being substantially identical to the display module 30, with the exception that the LEDs 20 disposed in the array on the surface thereof being specifically red, green and blue, respectively. Each of the display modules 64–68 has associated therewith a separate fiber optic bundle 70, 72 and 74, respectively. The fiber optic bundles 70, 72 and 74 all merge into a single fiber optic bundle 76 for connection to a display 78. A detail of the display is illustrated in FIG. 9a, wherein the fibers from the fiber optic bundles 70, 72 and 74 are merged in the fiber optic bundle 76 such that the LEDs in the display modules 64–68 that correspond to each other having the corresponding optical fibers disposed adjacent thereto in a triplet. For example, a single array location in each of the display modules 64, 66 and 68 would have a single triplet represented by a red optical fiber end 80, a green optical fiber end 82 and a blue optical fiber end 84, disposed in an adjacent relationship on the display 78.

Referring now to FIG. 10, there is illustrated a block diagram of the circuitry for generating the driving signals for the LEDs 20. The display array 30 is comprised of a plurality of DACs 86, each illustrated as driving a single LED 20. Each of the DACs 86 is operable to receive a digital input from an 8-bit bus 88 which is then converted to an analog value on the output thereof, the output comprising a sample and hold circuit, this being a conventional circuit. Further, this operation could be multiplexed such that a single DAC 86 could drive multiple sample and hold circuits with the sample and hold circuits controlled by one bit or more of the input to the DAC 86. Each of the DACs 86 would receive both the data input and an address input through the 8-bit bus 88. The bus 88 is driven by the decode address logic circuit 90. The decode address logic circuit 90 receives both an address input from an address bus 92 and a data input from the data bus 94. The address and data information are generated in a graphics processor unit (CPU) 96 which is operable to receive a video data input signal from a video bus 98 which is a digital input in either a YUV format or an RGB format. This data is typically input in a serial fashion from an external frame buffer or external video processing system. It is only necessary that when each pixel of information is input on the video data input to the bus 98, that the graphics processor unit 96 is operable to generate the appropriate address of the LED 20 and forward this data thereto. The module positions are determined by a module processor 100, which for a single module could be as simple as a counter circuit for sequentially stepping through the pixels that are output. Typically, video input data is input in scan lines beginning at the first pixel in a line and sequentially presenting data for each adjacent pixel in a line and then repeating this for each line in the vertical direction. Most display systems are "pixel mapped" such that a given line in a display is defined as a number of pixels. In the preferred embodiment, the display 10 is arranged as 1000 pixels wide and 1000 pixels high, the panel dimension would be approximately 5 inches×5 inches.

Figure 11:
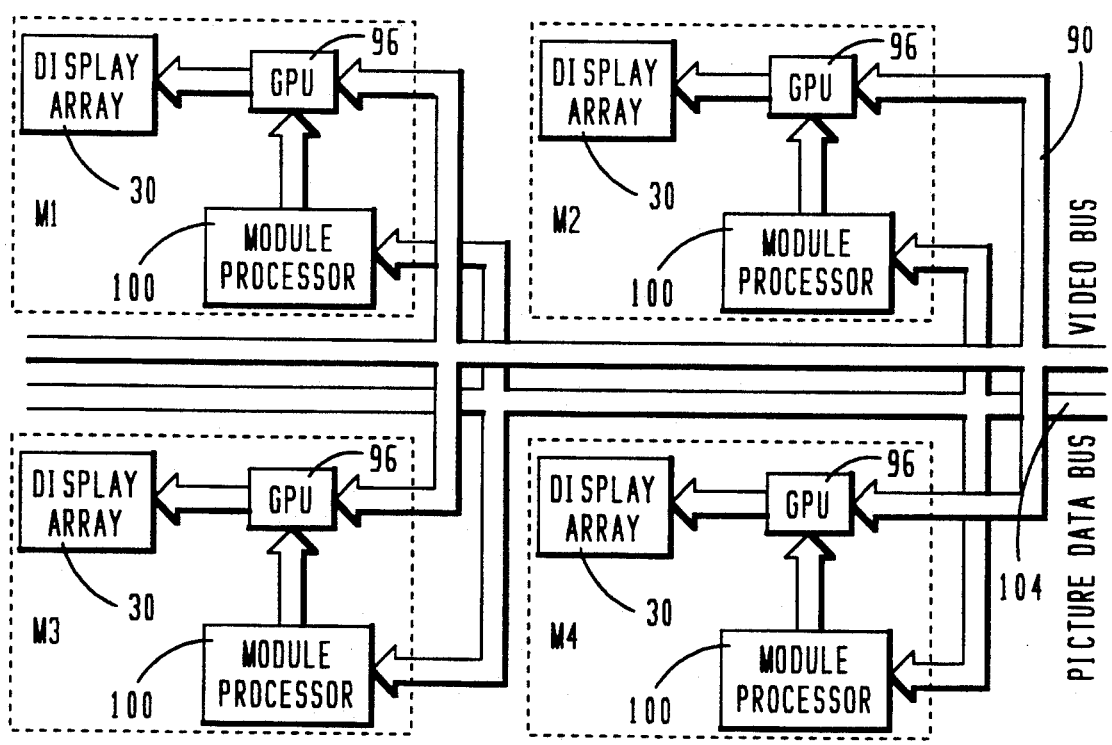
FIG. 11 illustrates an overall system utilizing an array of modules.

Referring now to FIG. 11, there is illustrated an overall system diagram illustrating the use of multiple panels M1, M2, M3 and M4. Each of the modules M1–M4 have associated therewith a display array 30, a graphics processor unit 96 and a module processor 100. The video data is input on the video data bus 98, which is common to all of the modules M1–M4, with picture data being input on a common data and control bus 104. The control and data bus 104 provides the position information and control information to the module processors 100 associated with each of the modules M1–M4 to allow the module to have some knowledge about its position in the overall display and the relative locations of the associated pixels. In this manner, a module has knowledge of whether it is in the upper left hand corner of the display or in the lower right hand corner such that when the video is input on the video bus. The module recognizes how to output this video data to a given LED 20 associated with its display array 30.

Referring now to FIG. 12, there is illustrated an alternate embodiment of the present invention wherein the image is generated by an external image device 106, such as a projector. The projector 106 is operable to project an image onto a surface 108 that has associated therewith a plurality of optical receivers which are referred to as optocollectors. These are typically optically sensitive active devices which generate a current on the output thereof corresponding to the intensity of light received on the input thereto. These optocollectors are arranged in a optocollector array 110 that is disposed adjacent to the surface 108. The signals output therefrom are input to a cable 114 that is connected to the input of the display module 16. In this manner, an image can be retrieved, converted to analog signals and then to digital signals for input to the display module 16. These digital signals (or analog signals) are then utilized to drive the LEDs, which then directly drive the inputs to the optical fibers in the fiber optic bundle 14 for transferring the image to the display 10.

Referring now to FIG. 13, there is illustrated an alternate embodiment of the present invention wherein the display is incorporated into the rear surface of a set of video goggles 118. This requires two displays, one for each eye. By utilizing such a configuration, three-dimensional programs can be provided. These are utilized for the newly emerging technologies referred to as virtual reality. The displays are driven by a system 120 which accepts the video discs and optical sound discs referred to as "CD ROMs".

Referring now to FIG. 14, there is illustrated a detail of the pixels that are disposed on a display 122, which is disposed on the rear surface of each side of goggles 18 associated with each eye of the user. The pixels are formed by fiber optics which are arranged in circumferential rings of various sizes.

In summary, there has been provided an image transfer system for generating on a first surface an image and transferring it through a fiber optic bundle to a second surface. The image generated on the first surface is generated through LEDs to provide a light source at the input to each of the optical fibers to directly drive the associated optical fibers. At the opposite end, the emitting end, of the optical fiber, the end thereof is enlarged through a linear taper proximate to the end thereof. This provides an expansion ratio of approximately 3:1.

Although the preferred embodiment has been described in detail, it should be understood that various changes, substitutions and alterations can be made therein without departing from the spirit and scope of the invention as defined by the appended claims.

What is claimed is:

1. An image transfer device, comprising:
   a two dimensional display surface defining a two dimensional array of pixels;
   a plurality of optical fibers having first and second ends with said second ends arranged in a two dimensional array corresponding to said two dimensional array of pixels on said display, each of said second ends abutting against a corresponding one of said pixels on said display surface, and said first ends arranged in a two dimensional array;
   a plurality of light emitters arranged in a two dimensional array on a monolithic planar substrate, each of said light emitters associated with a corresponding one of said first ends of said optical fibers and each of said light emitters operable to emit light at a predetermined wavelength into said associated first end of said optical fibers, each of said light emitters operable to be selectively turned off or on and have the light intensity thereof varied when on; and
   a pattern generator for controlling each of said light emitters to be on or off and also for controlling the light intensity thereof when on, said pattern generator determining which of said light emitters is on in order to emit light in accordance with a predetermined pattern and also controlling the intensity of the emitted light in accordance with said predetermined pattern.

2. The image transfer device of claim 1, wherein said light emitters are light emitting diodes.

3. The image transfer device of claim 1, wherein said two dimensional array of said light emitters is arranged in a bit-mapped configuration to said predetermined pattern and said array of light emitters is mapped into said display surface in accordance with said bit-mapped configuration, with said plurality of optical fibers.

4. The image transfer device of claim 1, wherein said light emitters in said two dimensional array comprise light emitters emitting light at different wavelengths.

5. The image transfer device of claim 4, wherein said light emitters in said two dimensional array of light emitters comprise red light emitters, green light emitters and blue light emitters, arranged in red-green-blue triplets, and said second ends of said optical fibers abut said display surface in such a manner that the ones of said optical fibers associated with each of said red-green-blue triplets are arranged in a substantially adjacent proximity to each other to form a red-green-blue triplet pixel in said two-dimensional array of said second ends.

6. The image transfer device of claim 5, wherein said light emitters in said two dimensional light emitter array are arranged in red-green-blue triplets in said two dimensional light emitter array such that said red light emitters, said green light emitters and said blue light emitters for each of said triplets are adjacent each other.

7. The image transfer device of claim 5, wherein said two dimensional light emitter array comprises a two dimensional array of red light emitters, a two dimensional array of green light emitters and a two dimensional array of blue light emitters with each of said red, green and blue arrays of light emitters having corresponding light emitters in each of said arrays organized to form red-green-blue triplets.

8. The image transfer device of claim 1, wherein each of said optical fibers comprises:
   a first section of optical fiber having a substantially constant first diameter and providing at one end thereof said first end of said optical fiber; and
   a second section of optical fiber having an increasing diameter increasing from the dimension of said first diameter to a second and larger diameter to provide said second end, said second section abutted with said first section and providing an expansion in cross-section of said optical fiber at said second end as compared to said first end.

9. A method for transferring an image to a display surface, comprising the steps of:
   providing a plurality of optical fibers having first and second ends;
   abutting the second end of each of the optical fibers to the display surface in a predetermined pattern;
   providing a plurality of light emitters, each associated with one of the optical fibers at the first end thereof;
   controlling each of said light emitters to emit light at a predetermined wave length into the first end of the associated one of the optical fibers; and
   controlling the intensity of each of the light emitters in accordance with a predetermined pattern, such that the pattern is reproduced at the display surface.

10. The method of claim 9, wherein the light emitters are light emitting diodes.

11. The method of claim 9, wherein the step of providing the plurality of light emitters comprises:
   disposing the light emitters in a predetermined array that is bit-mapped to the predetermined image; and
   interconnecting the optical fibers between the array and the display surface to map the array onto the display surface.

12. The method of claim 11, wherein the light emitters in the array emit light at different predetermined wavelengths.

13. The method of claim 17, wherein the step of providing light emitters comprises providing light emitters in the array that are operable to form red-green-blue triplets with the second end of the associated optical fibers for each of the red-green-blue triplets abutting the display surface in an adjacent relationship to form a red-green-blue pixel.

14. The method of claim 13, wherein the step of providing the light emitters comprises, providing a plurality of light emitters in the array that are arrayed in red-green-blue triplets with corresponding light emitters of the red-green-blue triplets disposed in adjacent relationship in the array.

15. The method of claim 13, wherein the step of providing the light emitters comprises, providing a first array of red light emitters, a second array of blue light emitters and a third array of green light emitters, each of the arrays having corresponding red, green and blue light emitting light emitters in the array to provide the red-green-blue triplets.

16. The method of claim 9, wherein the step of connecting the light emitters to the display surface comprises:

conducting the light emitted from the light emitters through a first optical fiber portion having a substantially constant first diameter; and conducting the light emitted from the first optical fiber portion to a second optical fiber portion having an increasing diameter to provide a second end of the optical fiber.

* * * * *

UNITED STATES PATENT AND TRADEMARK OFFICE
CERTIFICATE OF CORRECTION

PATENT NO. : 5,293,437
DATED : March 8, 1994
INVENTOR(S) : Michael A. Nixon

It is certified that error appears in the above-indentified patent and that said Letters Patent is hereby corrected as shown below:

Column 5, line 66, replace "(CPU)" with --(GPU)--.

Column 8, claim 13 line 60, replace "17" with --12--.

Signed and Sealed this

Ninth Day of August, 1994

*Attest:*

BRUCE LEHMAN

*Attesting Officer*  *Commissioner of Patents and Trademarks*